United States Patent [19]

Murphy et al.

[11] 4,324,431
[45] Apr. 13, 1982

[54] VEHICLE SEAT WITH INDIVIDUAL ADJUSTABLE FRONT THIGH SUPPORT

[75] Inventors: Randall T. Murphy, Farmington Hills; Dennis H. Heling, Canton, both of Mich.

[73] Assignee: Lear Siegler, Inc., Livonia, Mich.

[21] Appl. No.: 147,409

[22] Filed: May 6, 1980

[51] Int. Cl.³ ............................ A47C 3/00; A47C 7/02
[52] U.S. Cl. ..................................... 297/284; 297/460
[58] Field of Search ................ 297/284, 312, 458, 460

[56] References Cited

U.S. PATENT DOCUMENTS 3,632,166  1/1972  Lohr ..................................... 297/284
4,018,477  4/1977  Hogan ................................. 297/284

Primary Examiner—Patrick D. Lawson
Attorney, Agent, or Firm—Reising, Ethington, Barnard, Perry & Brooks

[57] ABSTRACT

A vehicle seat having a seat portion, a support frame for the seat portion, a back rest portion and an independently adjustable, front thigh support slidably supported at the front of the seat portion. A pair of spaced slideways define a slide path for the thigh support extending from a fully retracted position to a fully extended position. In a first embodiment of the invention, the slide path is inclined upwardly in a forward direction at an angle which is sufficiently small enough that the sliding friction between the slideways and corresponding slide members of the thigh support prevents the weight of the thighs of a person sitting in a seat from moving the thigh support in a retracting direction. In a second embodiment of the invention, the slide path lies in an upwardly extending curved surface. A pair of biased locking members are movable between unlocked and locked positions on their respective slideways to alternately unlock and lock the thigh support in any selected position between the fully extended and retracted positions.

11 Claims, 5 Drawing Figures

VEHICLE SEAT WITH INDIVIDUAL ADJUSTABLE FRONT THIGH SUPPORT

TECHNICAL FIELD

This invention relates to vehicle seats and more particularly to vehicle seats having an independently adjustable front thigh support.

BACKGROUND ART

During prolonged periods of motor vehicle travel the thighs of a person occupying a vehicle seat are subject to muscle fatigue which causes leg strain which, in turn, occasionally may develop into painful cramps. Although the muscle fatigue can be combated somewhat by continuously shifting the person's legs into different positions, this procedure remedies the situation only for a short time. To increase the comfort of the seat occupant, the front edge of the seat may be raised upwardly to provide a support for the thighs of the occupant. An automotive seat construction having an independently supported thigh support section which may be raised upwardly is shown by the U.S. Pat. No. of Lohr 3,600,037. The patent to Lohr discloses a thigh support bolster section supported on a shaft extending longitudinally through the bolster section and which is supported for rotation within supports of the seat molding. The shaft is formed in two sections which are connected by a friction clutch which normally secures the bolster section against pivotal movement.

An automotive seat construction is known in which a front section of the seat may be moved outwardly in a substantially horizontal direction and thereafter supported on a front frame section of the seat. However, during movement of the front seat section, the front seat section must be supported by the occupant of the seat.

Another seat generally of the type to which this invention relates is dislcosed by the U.S. Pat. No. 3,446,532 of Cramer.

DISCLOSURE OF THE INVENTION

An object of the present invention is to provide a slidably adjustable thigh support for a vehicle seat which is positively supported during movement of the thigh support to any desired position.

Another object of this invention is to provide a slidably adjustable thigh support for a vehicle seat that is supported along a slide path that extends upwardly and outwardly from a fully retracted position of the thigh support.

A further object of the invention is to provide a slidably adjustable thigh support for a vehicle seat which is supported for movement along a slide path which extends upwardly and outwardly from a fully retracted position of the thigh support wherein the slide path is curved.

Yet another object of the present invention is to provide a slidably adjustable thigh support including at least one slide unit for a vehicle seat which is supported for movement along a slide path defined by at least one slide support unit and which extends upwardly and outwardly from a fully retracted position of the thigh support wherein the slide path is disposed in a surface extending angularly upward from a plane containing a bottom support section of a seat frame, the angle being small enough so that the sliding friction between the slide support unit and the slide unit prevents the weight of the thighs of a person sitting on the seat from moving the support towards the fully retracted position from any extended position along the slide path.

It is still a further object of the invention to provide a slidably adjustable thigh support for a vehicle seat wherein the thigh support is slidably supported along a slide path extending upwardly and away from a fully retracted position of the thigh support and wherein locking means are provided for locking the thigh support in any selected position between a fully extended position and the fully retracted position of the thigh support.

In carrying out the above objects and other objects of this invention, a preferred embodiment of the invention in combination with a vehicle seat having a back rest portion and a seating portion retained on a frame structure comprises an independently supported, slidable bolster portion located adjacent to the front end of the seating portion adapted to support the thighs of an occupant of the seat. At least one slideway is fixedly connected to the frame structure for defining a slide path for the bolster portion to allow the bolster portion to extend from a fully retracted position to a fully extended position. The bolster portion includes at least one slide member slidably mounted on the slideway for slidably moving the bolster portion between the fully retracted and extended positions.

The objects, features and advantages of the present invention are readily apparent from the following detailed description of the best mode taken in connection with the accompanying drawings.

BEST MODE FOR CARRYING OUT THE INVENTION

Figure 1:
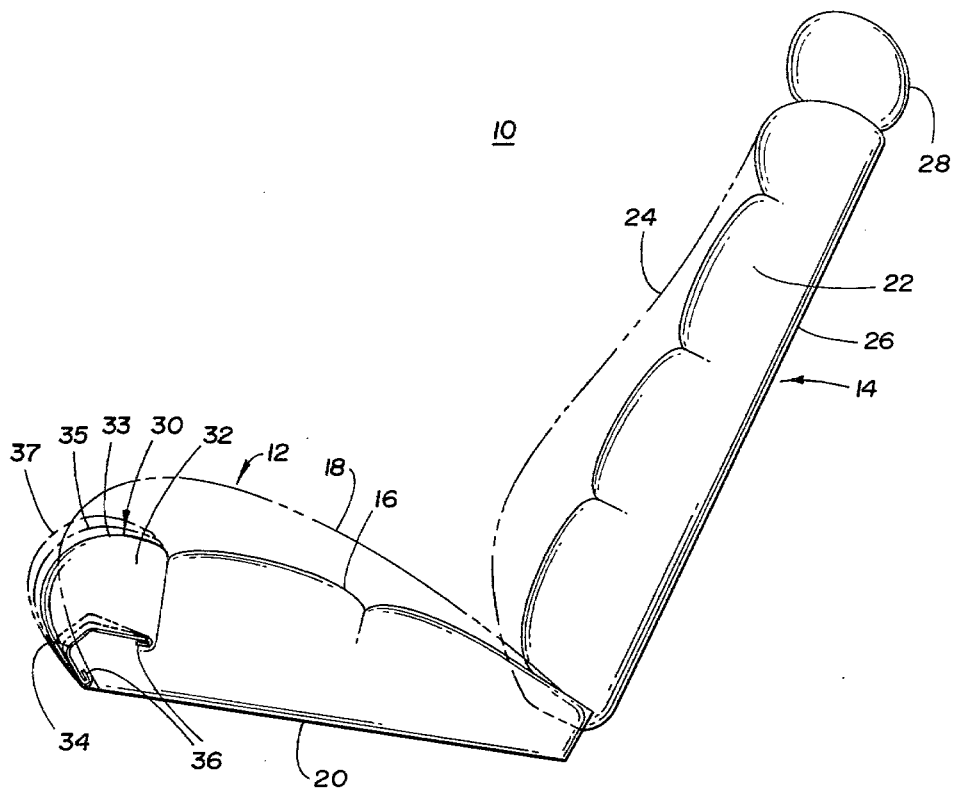
FIG. 1 is a side view of an exemplary bucket seat embodying the present invention and illustrating the bolster portion in various adjusted positions in phantom.

Referring to FIG. 1, a vehicle seat unit constructed according to the present invention is indicated collectively by reference numeral 10. The seat unit 10 is of the bucket seat type including a seating portion, generally indicated at 12 and a back rest portion, generally indicated at 14, pivotally secured thereto. The seating portion 12 includes a bottom cushion 16 located between a pair of spaced upwardly extending arms 18. The bottom cushion 16 is contained within a lower frame 20 of sheet metal or other suitable material. The back rest portion 14 includes a back cushion 22 and a pair of spaced upper sides 24. The back cushion 22 is contained within an upper frame 26 of sheet metal or other suitable material. Connected to the top portion of the back rest portion 14 is a headrest 28, also comprising a cushion.

The seat unit 10 also includes a slidably adjustable, thigh-supporting cushion or bolster portion, the preferred embodiment of which is generally indicated at 30. The bolster portion 30 is slidably supported at the front end of the seating portion 12. The bolster portion 30 includes a cushion or pillow-like structure 32 fixedly connected on an elongated bottom bracket 34 in a conventional fashion by folded ears 36 of the bottom bracket 34. The bolster portion 30 is mounted for movement between a fully retracted position, indicated at 33, an intermediate extended position, indicated at 35, and a fully extended position, indicated at 37. The bolster portion 30 moves between the positions 33, 35 and 37 as described in greater detail hereinbelow with reference to FIGS. 2 and 3 which omit the pillow-like structure 32 for the purpose of simplicity.

The bolster portion 30 includes a pair of spaced, parallel, downwardly extending mounting brackets 38 fixedly connected at opposite ends of the bottom bracket 34 such as by welding. Fixedly connected to the inner side surface 39 of each of the mounting brackets 38 is a U-shaped slide bracket, generally indicated at 40. Each slide bracket 40 includes a pair of spaced apart slide members 42 interconnected by a wall member 44 integrally formed therewith. Each of the slide brackets 40 is slidably mounted on a shaft 46 of a slide support unit, generally indicated at 48. Each shaft 46 extends through apertures 50 (only one of which is shown in phantom in FIG. 3) formed through the slide members 42. Disposed within each of the apertures 50 in sliding contact with each of the shafts 46 are a pair of nylon plastic bushings 52 and 54 to permit the slide bracket 40 to easily slide upon the shaft 46 as the bolster portion 30 is moved between the fully retracted position 33 and the fully extended position 37.

Figure 2:
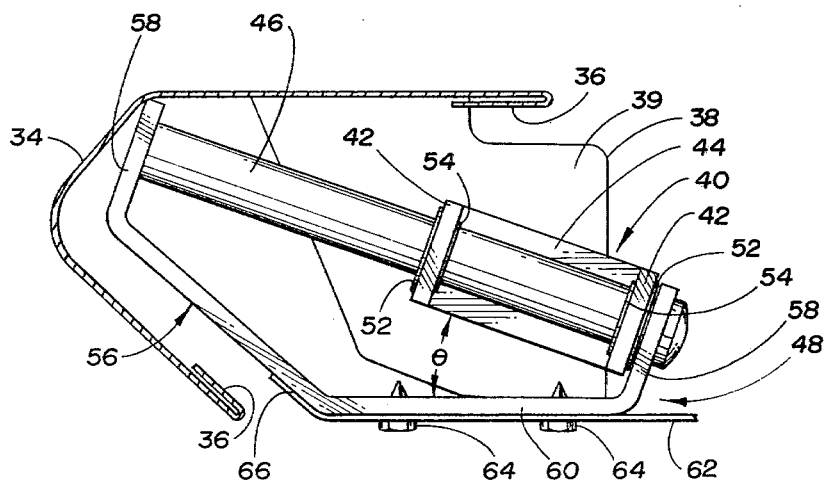
FIG. 2 is a side view partially in cross-section of a slide mechanism constructed in accordance with the present invention.
Figure 3:
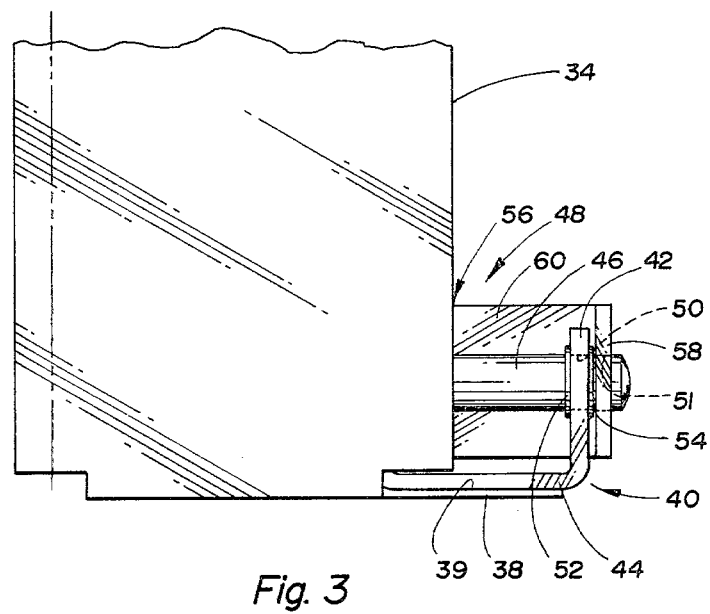
FIG. 3 is a top fragmentary view of a substantially identical slide mechanism spaced apart from the slide mechanism of FIG. 2.

Each slide support unit 48 also includes an integrally formed, V-shaped bracket, generally indicated at 56, having a pair of upwardly extending flanges 58 through which the opposite ends of its respective shaft 46 extend at holes 51 (only one of which is shown in phantom in FIG. 3). Each shaft 46 is fixedly secured to its respective flanges 58 such as by welding. One leg 60 of each of the brackets 56 is fixedly secured to a bottom section 62 of the frame 20 by screws 64. The bottom section 62 includes an upwardly turned flange 64 integrally formed therewith to prevent movement of the brackets 56 to the left as shown in FIG. 2 when the slide bracket 40 is forced against the bracket 56 in the fully extended position 37 of the bolster portion 30.

Alternately, instead of the shafts 46 being stationary, the slide brackets 40 can be made stationary by fixedly connecting them to their associated brackets 56. The flanges 58 can be formed with apertures and spaced closer together to allow the shafts 46 to slide therein after the shafts 46 have been fixedly connected to the mounting brackets 38.

Each of the parts shown in FIGS. 2 and 3 are metal parts except the bushings 52 and 54 which are plastic. However, it is to be understood that many of the parts may be integrally formed together by conventional injection molding techniques. For example, the bottom bracket 34, the mounting brackets 38 and the slide brackets 40 could all be formed into one plastic part. Also, the bottom section 62 and the brackets 56 could be molded into one part. It would therefore be a simple matter to slidably mount the bolster portion 30 to the frame 20 after aligning the slide members 42 between the flanges 58 so that the apertures 50 are aligned with the holes 51 to permit the insertion of the shafts 46 therethrough. Also, if the slide members 42 are made from plastic, the plastic bushings 52 and 54 can be eliminated.

Each of the supported shafts 46 are inclined or angled at an angle $\theta$ with respect to the flat bottom section 62 of the frame 20 as well as the leg 60 of the bracket 56. The angle $\theta$ between the shafts 46 and the legs 60 is preferably equal to 20 degrees. However, if $\theta$ equals 25 degrees, the sliding friction between the bushings 52 and 54 and the supported shafts 46 is still enough to prevent the weight of the thighs of a person sitting on the seat unit 10 from moving the bolster portion 30 toward the fully retracted position 33 along the slide path defined by the supported shafts 46 from any extended position along the slide path. In other words, because the angle $\theta$ is relatively small, there is no need to have a separate locking mechanism to lock the slide brackets 40 on the supported shafts 46 when the bolster portion 30 is in one of its extended positions. The sliding friction between bushings 52 and 54 and the supported shafts 46 is adequate.

The bolster portion 30 is slidably adjusted from its fully retracted position 33 when the occupant of the seat grasps the bolster portion 30 and moves the bolster portion 30 outwardly and away from the bottom cushion 16 to its desired position. Thereafter, the bolster portion 30 maintains its selected position of the shafts 46 due to the sliding friction between the shafts 46 and the bushings 52 and 54 of the slide bracket 40. The angle $\theta$ which the shafts 46 make with respect to the legs 60 of the V-shaped brackets 56 is sufficiently small so that the sliding friction prevents the weight of the occupant's thighs from forcing the bolster portion 30 back towards its fully retracted position 33. The occupant of the seat unit 10 merely has to push the bolster portion 30 along the longitudinal axes of the shafts 46 to move the bolster portion 30 back towards its fully retracted position 33.

Figure 4:
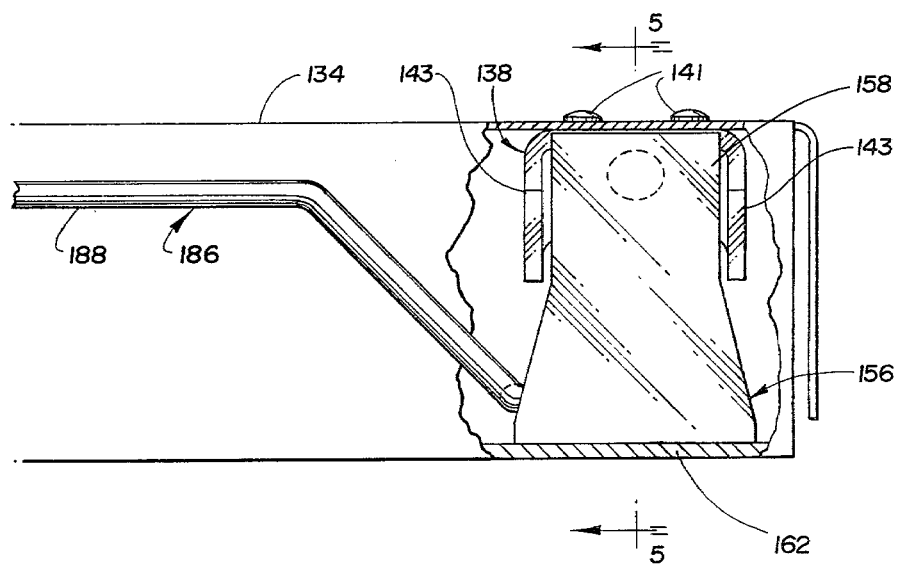
FIG. 4 is a front fragmentary view partially broken away of a second embodiment of the invention.
Figure 5:
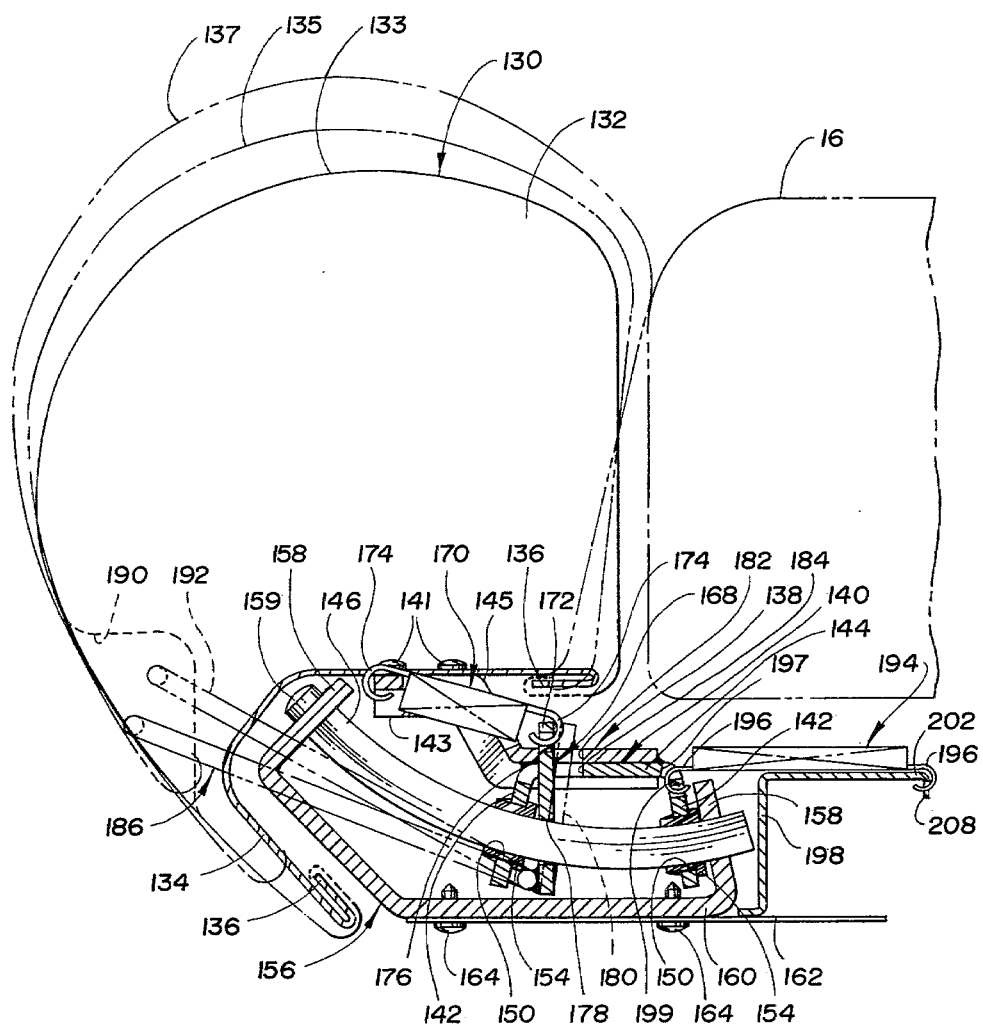
FIG. 5 is a cross-sectional, fragmentary view taken along line 5—5 of FIG. 4 illustrating the thigh support in various adjusted positions in phantom.

Referring now to FIGS. 4 and 5, there is shown a second embodiment of the present invention wherein parts depicted therein which perform the same or similar function as the parts of the first embodiment have the same reference numeral prefaced by the number 1. For example, a part labeled 10 in the first embodiment is labeled 110 in the second embodiment.

Referring now to FIG. 5, there is shown a bolster portion 130, independently slidably supported and mounted adjacent the front end of the bottom cushion 16. The bolster portion 130 is shown in its fully retracted position at 133, in its fully extended position at 137, and in an intermediate extended position at 135. The bolster portion 130 includes a pillow-like structure 132 which is conventionally mounted on a bottom bracket 134. The bottom bracket 134 includes a pair of ears 136 folded at its opposite ends to maintain the pillow-like structure 132 on the bottom bracket 134. Only one-half of the slide mechanism of the bolster portion 130 is described hereinbelow since the other half of the slide mechanism is substantially the same as the first half of the slide mechanism (as was true in the description of the first embodiment).

A mounting bracket, generally indicated at 138, is fixedly connected to the bottom surface of the bottom bracket 134 adjacent the uppermost ear 136 by bolts 141. The mounting bracket 138 includes a pair of spaced side walls 143 and an interconnecting top wall 145 integrally formed therewith. A U-shaped slide bracket 240 is fixedly connected to the bottom surface of the top wall 145 at its lower end such as by welding. The slide bracket 140 includes a pair of spaced slide members 142 and an interconnecting top wall member 144 integrally formed therewith. The slide bracket 140 is slidably mounted on an upwardly curved shaft 146 which extends through apertures 150 formed through the slide members 142. The slide members 142 have plastic nylon bushings 154 disposed within their respective apertures 150 to facilitate the sliding movement of the slide bracket 140 on the shaft 46. The outwardly facing end surfaces of the bushings 154 also function as stops for the slide bracket 140 against spaced, upwardly extending flanges 158 of a V-shaped bracket 156 between which the ends of the shaft 146 extend and are mounted thereon. The upper end of the shaft 146 is mounted to the uppermost flange 158 by a threaded bolt 159. The lower end of the shaft 146 is fixedly connected to the opposite flange 158 such as by welding. A bottom leg 160 of the V-shaped bracket 156 is fixedly connected to a bottom section 162 of the frame 20 such as by screws 164.

The U-shaped slide bracket 140 is alternately allowed to slide along the shaft 146 and prevented from sliding along the shaft 146 by a paddle-shaped locking member 168 which is mounted on the shaft 146. A top portion 172 of the locking member 168 is biased by a relatively stiff spring 170 to move towards the bottom surface of the bottom bracket 134 by rotating about the shaft 146. The spring 170 extends between and is connected to the bottom bracket 134 and the top portion 172 of the locking member 168 by hooked portions 174 formed at its opposite ends. The hooked portions 174 extend through holes 176 (only one of which is shown) formed through the bottom bracket 134 and the locking member 168. The shaft 146 extends through an opening 178 formed through the lower part of the locking member 168. The locking member 168 has a locked position on the shaft 146 shown in solid and an unlocked position shown in phantom at 180 wherein the locking member 168 is substantially perpendicular to that portion of the curved shaft 146 on which it is supported. In the locked position of the locking member 168, the inner surfaces of the locking member 168 defining the opening 178 bind against the outer surface of the curved shaft 146 to prevent movement of the locking member 168 therealong.

The top portion 172 of the locking member 168 extends upwardly through aligned apertures 182 and 184 which are formed through the bottom portion of the top wall 145 and the attached wall member 144, respectively. As a result, the slide bracket 140 moves with the locking member 168 along the shaft 146. When the locking member 168 is in its unlocked position 180, the slide bracket 140 is also unlocked to allow sliding movement along the shaft 146. In the same fashion, when the locking member 168 is in its locked position, the slide bracket 140 is also prevented from moving downwardly along the shaft 146.

As shown in FIGS. 4 and 5, a hollow, bent, metal tube, generally indicated at 186, extends between and is connected to the front surface of each of the locking members 168 such as by welding at its opposite ends. A front portion 188 of the tube 186 extends within a grooved portion 190 of the pillow-like structure 132 and is adapted to be gripped by an occupant of the seat unit 110 at the grooved portion 190. With the tube 186 in the phantom position indicated at 192, the locking member 168 is unlocked in order to move the slide bracket 140 along the shaft 146 and thus move the bolster portion 130 to one of its extended positions between the fully retracted position 133 and the fully extended position 137. When the desired position of the bolster portion 130 is attained, the front portion 188 of the tube 186 is released thereby allowing the spring 170 to automatically move the locking member 168 into its locking position on the shaft 146.

To facilitate movement of the bolster portion 130 back towards its fully retracted position 133, the slide bracket 140 is biased to the right as shown in FIG. 5 by a relatively weak spring, generally indicated at 194. The spring 194 includes hooked portions 196 which extend between and are connected to the slide bracket 140 and a stepped portion 198 of the frame 20. One of the hooked portions 196 is hooked through a pair of apertures 197 and 199 formed through the wall member 144 and one of the slide members 142, respectively. The other hooked portion 196 extends through an aperture 200 formed through a downwardly extending flange 202 of the stepped portion 198. The stepped portion 198 is fixedly mounted on the top surface of the bottom section 162 to support the spring 194.

To slidably adjust the bolster portion 130 from any position on the shafts 146, the locking action of the locking members 168 is removed by pulling the front portion 188 of the tube 186 upwardly to its upper position 192. Thereafter the bolster portion 130 is free to be manually slid outwardly and upwardly or inwardly and downwardly to the extent desired as long as the locking members 168 are maintained in their unlocked positions 180. Upon release of the front portion 188 of the tube 186, the springs 170 cause the locking members 168 to rotate to its locked position on the shafts 146 thereby preventing movement of the locking members 168 as well as the slide brackets 140 along the shafts 146.

While two embodiments of the invention have been shown and described herein in detail, those skilled in this art will recognize various alternative designs and embodiments for practicing the present invention as defined by the following claims.

What is claimed is:

1. In combination with a vehicle seat having a back rest portion and a seating portion retained on a frame structure, an independently supported slidable bolster portion located adjacent to the front end of said seating portion and adapted to support the thighs of an occupant of said seat; at least one slideway fixedly connected to said frame structure for defining a slide path for the bolster portion to allow the bolster portion to extend from a fully retracted position to a fully extended position; and said bolster portion including at least one slide member slidably mounted on said slideway for slidably moving said bolster portion between said fully retracted and extended positions, wherein one of said slide member and said slideway includes a support shaft and a pair of spaced support flanges extending outwardly therefrom for supporting said support shaft therebetween and wherein the other of said slideway and said slide member includes a pair of interconnected spaced slide elements, said slide support shaft extending through apertures formed through the slide elements, said slide elements sliding on the slide support shaft to allow said bolster portion to move between said fully extended and retracted positions.

2. The combination as claimed in claim 1 including bearing members disposed within said apertures for slidably supporting said slide elements on said support shaft.

3. The combination as claimed in claim 1 wherein the frame structure includes a bottom section and wherein said slide path is inclined upwardly so that the sliding friction between the slideway and the slide member prevents the weight of the thighs of a person sitting on the seat from moving the bolster portion toward said fully retracted position along said slide path from any extended position along said slide path.

4. The combination as claimed in claim 1 wherein said slide path is inclined at an angle less than 30 degrees along the entire length of said slide path.

5. The combination as claimed in claim 4 wherein said slide path lies in an upwardly extending plane.

6. The combination as claimed in claim 1 wherein said slide path lies in an upwardly extending curved surface.

7. The combination as claimed in claim 1 wherein said combination further includes locking means operatively associated with said slide member for locking said bolster portion in any selected position between said fully extended and retracted positions.

8. The combination as claimed in claim 7 including unlocking means operatively connected to said locking means and adapted for engagement by the occupant of the seat for unlocking said locking means and for moving said bolster portion along said slide path.

9. The combination as claimed in claim 8 wherein said locking means includes a locking member adapted to move with said slide member along said slide path; said locking member being movable between locked and unlocked positions on said slideway, said unlocking means moving said locking member into its unlocked position.

10. The combination as claimed in claim 9 wherein said locking means includes biasing means connected to said locking member for biasing said locking member into its locking position so that the locking member automatically locks the slide member on the slideway, said unlocking means being released by the occupant of the seat.

11. The combination as claimed in claim 10 including second biasing means connected to said slide member for urging said bolster portion towards its fully retracted position.

* * * * *